LAUNDRY FEEDING MACHINE

Original Filed May 16, 1966 6 Sheets-Sheet 1

Inventor
Henry John WEIR
By Wenderoth, Lind and Ponack
Attys

LAUNDRY FEEDING MACHINE

Original Filed May 16. 1966 6 Sheets-Sheet 2

Inventor
Henry John WEIR
By Wenderoth, Lind and Ponack
attnys

LAUNDRY FEEDING MACHINE

Original Filed May 16. 1966 6 Sheets-Sheet 3

Inventor
Henry John WEIR
By Wenderoth, Lind & Ponack
Attys

LAUNDRY FEEDING MACHINE

Original Filed May 16. 1966 6 Sheets-Sheet 4

Inventor
Henry John WEIR
By Wenderoth, Lind & Ponack
Attys

LAUNDRY FEEDING MACHINE

Original Filed May 16. 1966 6 Sheets-Sheet 5

Inventor
Henry John WEIR
By Wenderoth, Lind & Ponack
Attys

LAUNDRY FEEDING MACHINE

Original Filed May 16, 1966 6 Sheets-Sheet 6

Inventor
Henry John WEIR
By Wenderoth, Lind & Ponack
attys

United States Patent Office

Re. 27,442
Reissued July 18, 1972

27,442

LAUNDRY FEEDING MACHINE

Henry John Weir, Sedbury, England, assignor to McGraw-Edison Company, Elgin, Ill.

Original No. 3,421,756, dated Jan. 14, 1969, Ser. No. 550,439, May 16, 1966. Application for reissue May 28, 1970, Ser. No. 41.655
Int. Cl. D06f *67/04*
U.S. Cl. 38—143 25 Claims

Matter enclosed in heavy brackets [ ] appears in the original patent but forms no part of this reissue specification; matter printed in italics indicates the additions made by reissue.

ABSTRACT OF THE DISCLOSURE

A laundry flatwork feeding machine comprising a conveyor having an upper run which moves in a forward direction, a pair of clamps adapted to grip the two corners for moving the clamps apart transversely and holding them apart under tension in the leading edge whereby the flatwork article is stretched laterally, means coupled with the conveyor for advancing the clamps thereon held apart over the upper run of the conveyor at the same speed and means for opening the clamps to drop the leading edge on the conveyor whereby rucking of said leading edge is prevented.

The invention relates to laundry feeding machines and has particular application in machines for feeding laundry articles (usually flat-work articles such as sheets) to ironing machines.

If satisfactory results are to be obtained in the ironing of flat-work articles in commercial ironing machines it is essential that the article be presented to the machine with the leading edge square and with no significant rucks or folds. The only practicable way of achieving this result heretofore found is to employ skilled operators to lay the articles on the ironing machine conveyor which feeds the calender. These operators must be extremely proficient and their training takes a considerable time. The output of an ironing machine depends entirely on the speed and skill of the two operators feeding it and since these operators cannot readily be replaced the laundry is unduly dependent on them. Thus far no automatic feeding machine has been devised which is commercially more viable than the two operators. It is an object of the present invention to provide such a machine.

There are several problems to be overcome in the design of as atisfactory automatic feeding machine. The first of these arises from the fact that different ironing machines run at different speeds and even the speed of a given ironing machine is liable to vary apreciably because of variation in loading and electricity supply fluctuations, for example. It is found that this interoduces difficulties if an attempt is made to simulate the action of the operators by grasping the corners of the leading edge of the article in clamps and laying the article thereby directly on the ironing machine conveyor. If the forward speed of the clamps is not equal to the forward speed of the conveyor the leading edge of the article is not laid straight.

According to the present invention a laundry feeding machine comprises a conveyor having an upper run which moves in a forward direction, a pair of clamps adapted to grip the two corners of a leading edge of a laundry article to be fed, means for moving the clamps apart transversely and holding them apart under tension in the leading edge, means coupled with the conveyor for advancing the clamps thus held apart over the upper run of the conveyor at the same speed thereas and means for opening the clamps to drop the leading edge on the conveyor.

Thus the present invention provides a laundry feeding machine which has a conveyor of its own with which the forward component of movement of ap air of clamps is synchronised by a coupling between means provided for advancing the clamps and the conveyor. In this way any problems which might have been experienced is synchronising the clamps with the conveyor of an ironing machine to be fed are avoided. Preferably, the feeding machine conveyor speed is adjustable so that it can be set to be slightly slower than the slowest speed of the following ironing machine conveyor.

Another problem arises because of the tension which is introduced in the leading edge of the article if the two corners of that edge are to be stretched fully apart. On release of the article held in this way it is found that the tension in the leading edge pulls the corners inwards and results in the leading edge becoming rucked. A further object of the invention is to overcome this problem. To this end there are preferably provided means for releasing, before the leading edge is dropped, the force which holds the clamps apart against the tension in the leading edge. Usually the clamps will be held part against the tension in the leading edge by some form of brake and generally it would be sufficient simply to release the brake shortly before the clamps are opened, the inertia of the lamps and equipment linked thereto being sufficient to prevent the releasing tension of the article from drawing the corners of the leading edge inwardly beyond their normal positions. However, if the clamps and associated linkages are particularly light it may be necessary to link one or both clamps a a damper which may take hte form, for example, of a pneumatic or hydraulic dashpot.

Preferably, each clamp comprises a pair of backwardly facing jaws. Thus an operator can stand at the back of the machine, insert the two ends of the leading edge of the article between the jaws which face her and energise the clamp transport so that the leading edge is carried away over the upper run of the conveyor. However, with this type of jaw there is a danger that, unless precaustions are taken on opening the clamps, the leading edge will fold back over the article. In order to overcome this difficulty means are provided for moving the clamps relative to the article in a forward direction as the clamps ar opened. It is possible to provide means which accelerate the clamps forward immediately they are opened. For example, in one embodiment of the invention the clamps art driven forward by a pneumatic ram which would normally be effective to move the clamps forward considerably faster than the forward speed of the conveyor, but the action ofw hich is restricted by a clutch linked to the conveyor drive so that the clamps travel at exactly th speed of the conveyor. On opening the clamps the clutch is simultaneously released and this allows the ram to accelerate the clamps away.

However, it is preferred that the clamps continue to move forwards at a ocnstant speed and that the article is instantaneously retarded as the clamps are opened. Preferably this is accomplished by a roller over which the trailing part of the article is draped as the article is moved forwards and means for retarding the roller instantaneously as the clamps are opened, thereby causing an instantaneous drag on the article.

It is desirable that the machine be able to accommodate articles of a wide range of widths and it is therefore necesary to arrest the transverse movement of the clamps at a place appropriate to the width of the particular article being fed. In accordance with further aspects of the invention this may be accomplished in two ways. Firstly, and preferably, sensing means are provided for initiating the arrest of the transverse movement of the clamps when the leading edge of the article held thereby approaches a straight line. The sensing means may comprise a lamp and photo-cell arrangment which casts a beam of light across substantially the straight line between the clamps and which issues an arrest signal when the beam of light is broken by the leading edge of the article or a micro-switch having an operating arm which is engaged by the leading edge of the article as the leading edge is straightened, circuit means being provided whereby an arrest signal is issued on engagement of the operating arm.

Secondly, means may be provided for initiating the arrest of the transverse movement of the clamps when the tension in the leading edge of the article held thereby exceeds a predetermined limit. Preferably, such tension-responsive means comprises a resilient mount whereby at least one of the clamps is mounted on the means for driving the clamps transversely, a micro-switch coupled with the mount to be operated when the associated clamp is moved a predetermined amount against the resilience of the mount, and circuit means whereby an arrest signal is issued on operation of the micro-switch.

Although the clamps may be operated electrically hydraulically or pneumatically it is preferred, for the sake of simplicity, that they be of a purely mechanical nature. Thus, in a preferred embodiment of the invention each clamp comprises a pair of backwardly facing jaws, a spring for holding the jaws closed, an opening member adapted to engage a stop on the machine and thereby open the jaws against the spring force when the clamp has been moved forwards a predetermined distance, a latching mechanism for holding the jaws open against the spring force and a release catch for releasing the latching mechanism to clamp the jaws on to the article to be held, the release catch being manually operable by the operator as the article is placed between the jaws.

Preferably the clamps are mounted on a beam which extends above and across the conveyor, there being provided means for moving the beam forward and back over the conveyor, coupling means comprising an endless loop arrangement, one clamp being fixed to one side of the loop and the other clamp being fixed to the other side of the loop, the clamps being so arranged that movement of the loop arrangement moves the clamps across the beam symmetrically away from or towards the centre of the beam, and driving means for moving the loop arrangement.

The loop may be constituted by an endless wire running over pulleys mounted one on each end of the beam, the driving means comprises a linear driving mechanism coupled directly to one of the clamps, and there is provided a brake mechanism comprising a brake rod fixed to one of the clamps and extending across the beam and a friction brake fixed on the beam and arranged, on actuation, to clamp the brake rod and thereby arrest the transverse movement of the clamps and hold the clamps in the arrested position.

Alternatively, the loop may be constituted by an endless chain arrangement running over sprockets mounted one on each end of the beam and one of the sprockets includes a brake which, on actuation, brakes the sprocket and thereby arrests the transverse movement of the clamps and holds the clamps in the arrested position. The chain arrangement may be constituted by a single endless chain running across the width of the machine. However, since such a long run of chain tends to sag undesirably it is preferred that the chain arrangement, when provided, be constituted by two endless chains each extending over a respective half of the machine width and each running around a respective sprocket at the centre of the machine, the two central sprockets being coupled to move together. With this arrangement one clamp is fixed to one run of one chain and the other clamp is fixed to the other run of the other chain.

The foregoing description is concerned with the laying of the leading edge of the article squarely on the conveyor, this being a particularly difficult and important task. However, even when the leading edge is properly laid there remains the problem of ensuring that the trailing part of the article is not unduly rucked or folded. Thus, it is preferred that, as the article is fed forwards by the machine, the trailing part of the article is drawn upwardly through an air-box arrangement which extends at the rear of the machine across its width and which defines a substantially vertical channel through which the trailing part of the article is drawn, the channel having an opening at the rear to allow access of the article thereto, the air-box arrangement comprising hollow air-boxes and means for supplying air under pressure thereto, the air-boxes having louvres which open into the channel and which direct pressurised air from within the air-boxes horizontally into the channel outwardly from its centre.

The invention will further be described with reference to the accompanying drawings, of which:

Figure 1:
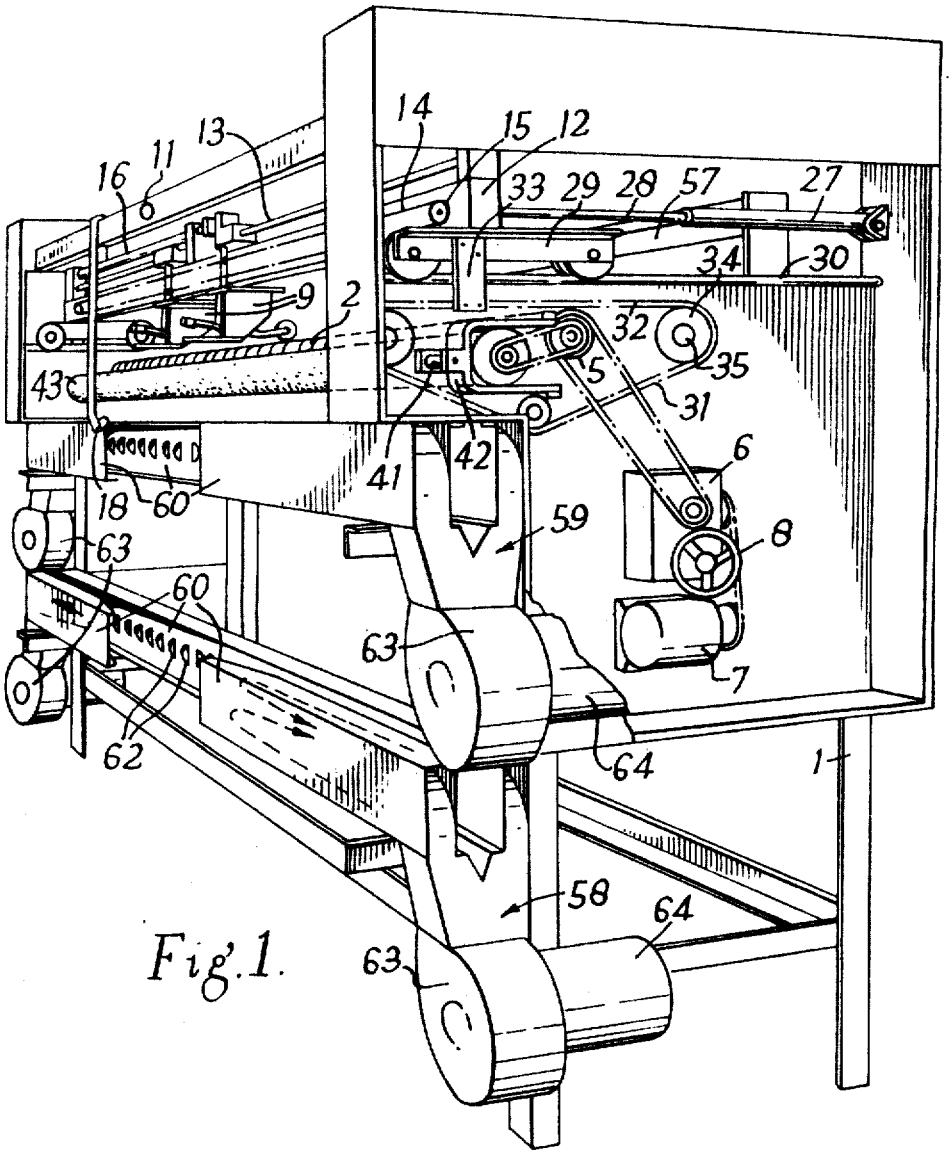
FIGURE 1 is a perspective view, from the lower right-hand side and rear of a laundry feeding machine in accordance with the invention.
Figure 2:
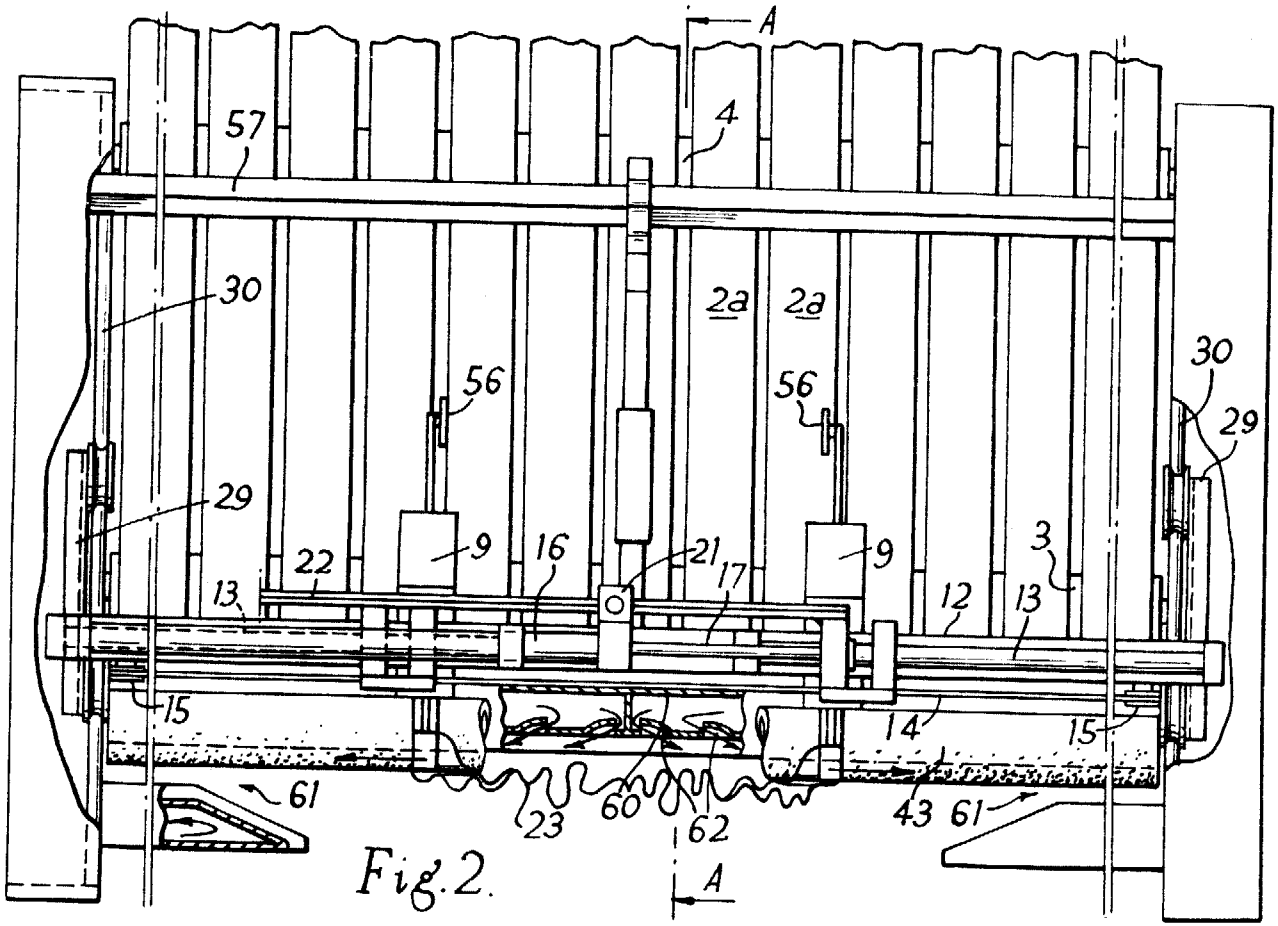
FIGURE 2 is a plan view of the machine.
Figure 3:
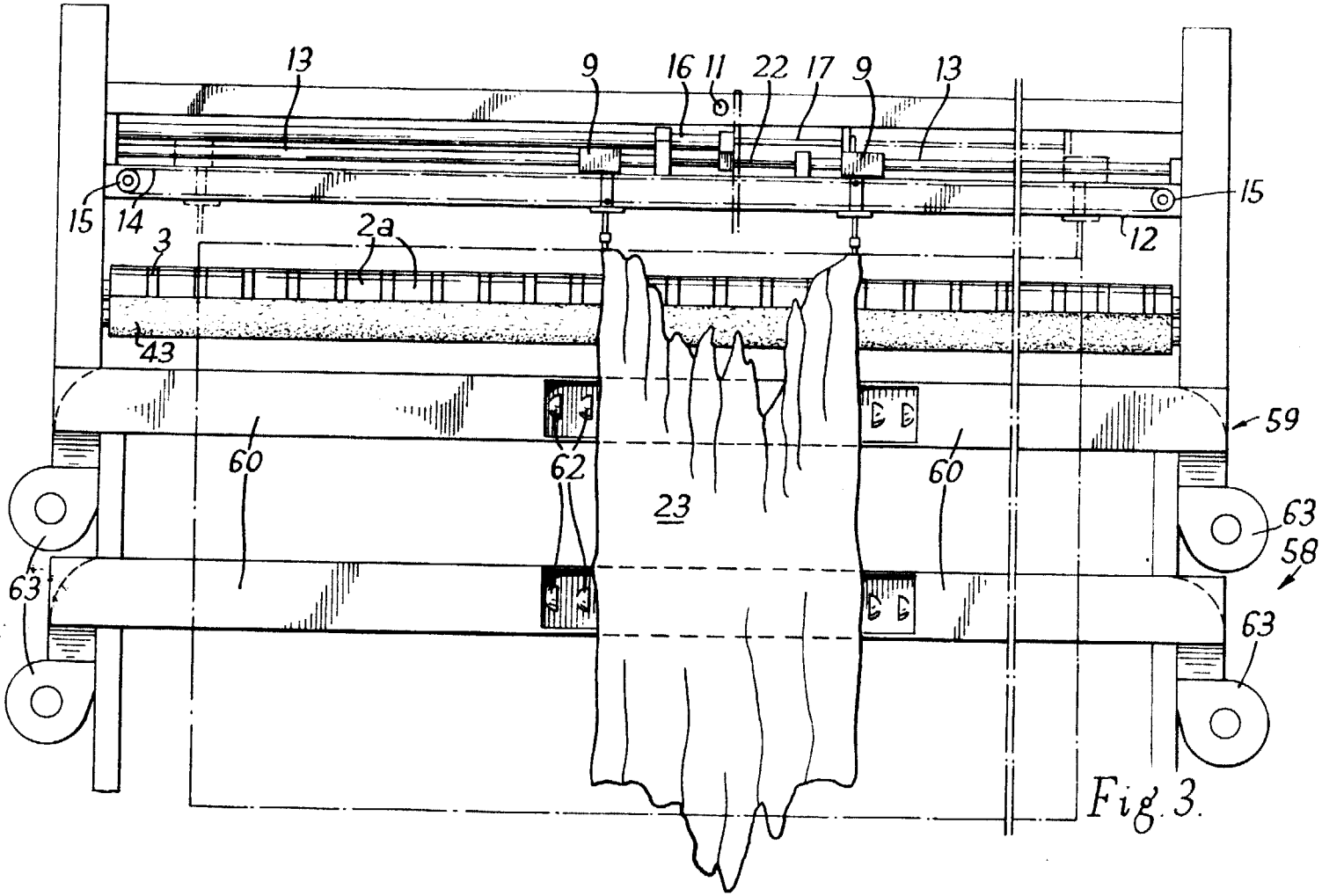
FIGURE 3 is a rear elevation of the machine.

Referring to FIGURES 1 to 3 the machine has a free-standing frame 1 in which is mounted a conveyor 2 comprising a number of parallel bands 2A which, when the machine is in operation run continuously and at nominally constant-speed around a series of rollers of which the rear-most is shown at 3. A front roller 4 (FIGURE 2) is provided near the front of the machine and is the same height as roller 3 so that over the run between rollers 3 and 4 the conveyor is substantially horizontal. A front end roller (not shown) is provided in front and below roller 4 so that the upper run of the conveyor is inclined downwardly after passing over roller 4. The conveyor moves in the forward direction indicated by the arrow (FIGURE 2) and the function of the machine is to lay a laundry flat-work article (taken for the sake of illustration to be a sheet) on to the upper run of the conveyor 2 with its leading edge straight and perpendicular to the direction of movement, the sheet being drawn forwards by the conveyor and delivered from the foremost end of the conveyor of an ironing machine (not shown), behind which the feeding machine is placed.

The drive to the conveyor is provided through roller 3 which has a sprocket 5 (FIGURE 1) on one end which is driven by chain through a variable ratio gearbox 6 from an electric motor 7. A hand-wheel 8 is effective to adjust the gear ratio so that the forward speed of the conveyor may be adjusted to be slightly slower than the slowest speed of the ironing machine conveyor. In this way it is ensured that in being fed onto the ironing machine conveyor the sheet experiences a dragging tension and is therefore not rucked in the transfer.

A machine operator stands at the rear of the machine and at a convenient height there is provided a pair of clamps 9 which have backwardly facing jaws 10. The operator's job is to insert between these two sets of jaws, which are normally two feet apart, the two corners of the leading edge of the sheet and then to press an operating button 11 to initiate the machine operation.

Figure 4:
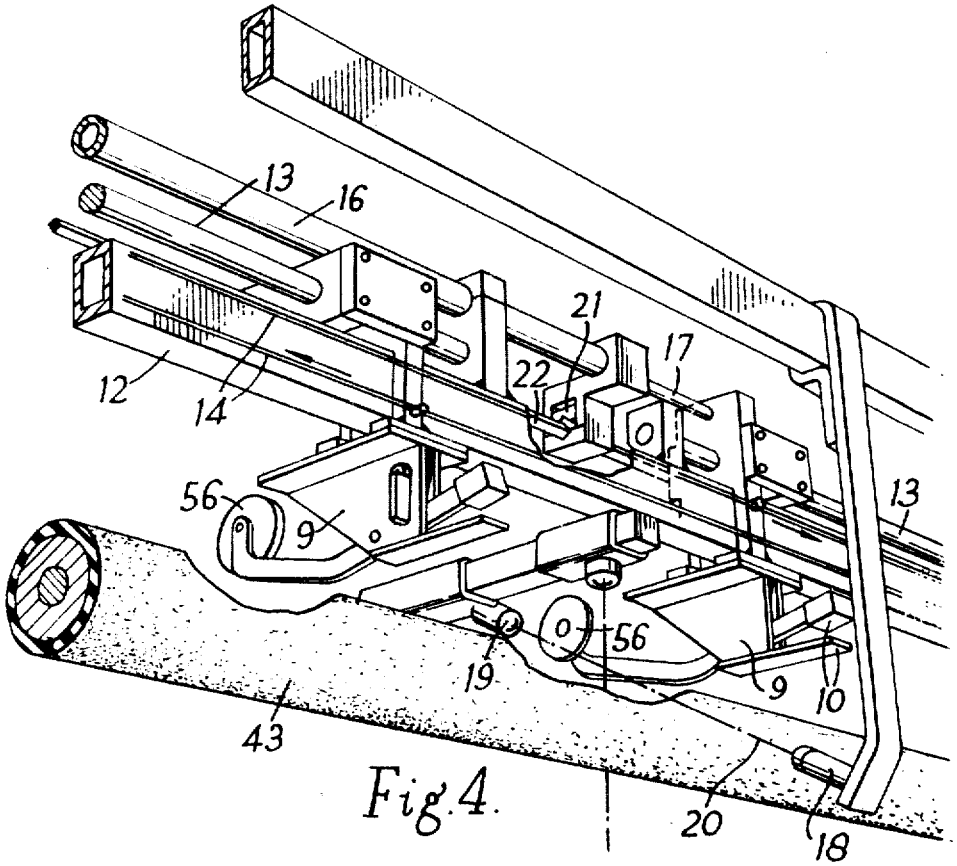
FIGURE 4 is a perspective view of detail of the clamp mounting arrangement of the machine.

Clamps 9 are mounted on a cross-beam 12 which extends from side to side of the machine, the clamps being mounted to slide sideways on guide rods 13. The clamps are coupled to move together symmetrically with respect to the centre of the beam by an endless loop of wire 14 which runs over pulleys 15 at each end of the beam. The right-hand clamp is fixed to the upper run of the loop and the left-hand clamp to the lower run. This is shown best in FIGURE 4.

Button 11 is a switch which is connected in circuit with an electricity supply and a solenoid operated pneumatic valve (not shown). Depression of button 11 by the operator when the corners of the leading edge of the sheet are held by the clamps opens the valve and admits air from a pressure line (not shown) to one side of a double acting pneumatic ram 16. The cylinder of the ram is fixed on the cross-beam 12 and the piston is coupled through the connecting rod 17 to the right-hand clamp. Therefore, depression of button 11 has the effect of pushing the right-hand clamp to the right from its rest position and, because the clamps are coupled together by wire 14, the left-hand clamp is drawn simultaneously to the left. This straightens the leading edge of the sheet.

A photo-electric sensing arrangement comprising a lamp 18 and a photo-cell 19 is provided to determine when the leading edge has been straightened and thus when the transverse movement of the clamps should be arrested. At the centre line of the machine lamp 18 throws a narrow beam of light 20 to photo-cell 19 along a path which crosses the vertical plane through the two sets of clamp jaws at a point slightly lower than the straight line joining the two sets of jaws. Thus the sheet brakes the beam when its leading edge is almost straight. Interruption of the light beam 20 causes an amplifier (not shown) associated with the photo-cell to issue an arresting signal in the form of supply of energising current to an electro-magnetic brake 21. This brake is effective to act upon a brake rod 22 which passes therethrough and which is fixed at one end to the right-hand clamp 9. The body of the brake is fixed on beam 12 and energisation thereof arrests the transverse motion of both clamps. The timing of the arresting signal is arranged in conjunction with the inherent delays in the braking system so that the clamps are arrested and held by the brake against tension in the leading edge.

Figure 5:
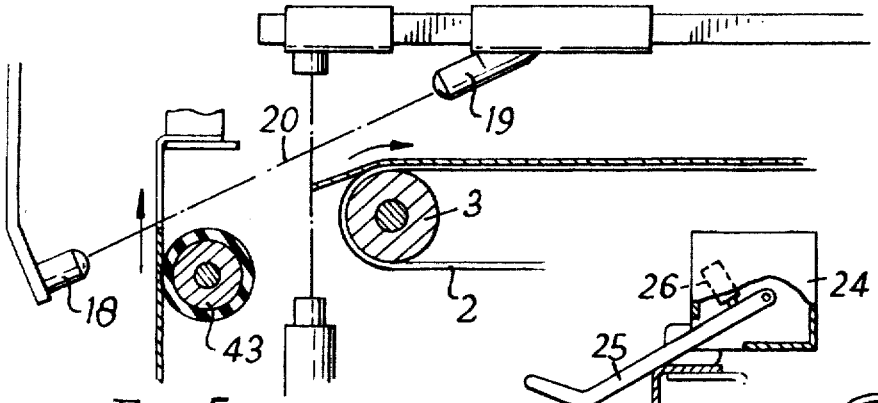
FIGURE 5 is a schematic sectional end elevation illustrating the photoelectric sensing device and FIGURE 6 is a similar view illustrating a mechanical equivalent thereof.
Figure 6:
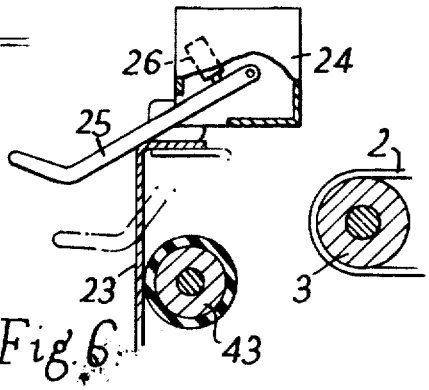

FIGURE 5 shows the position of the sheet (shown at 23) at the moment the beam 20 is broken. FIGURE 6 shows an alternative form of sensing device which comprises a micro-switch unit 24 mounted at the centre of beam 12 and having an operating arm 25 which depends below the line joining the clamp jaws. As the leading edge of the sheet is straightened its centre pushes arm 25 upwards and operates the micro-switch which is shown at 26.

Figure 7:
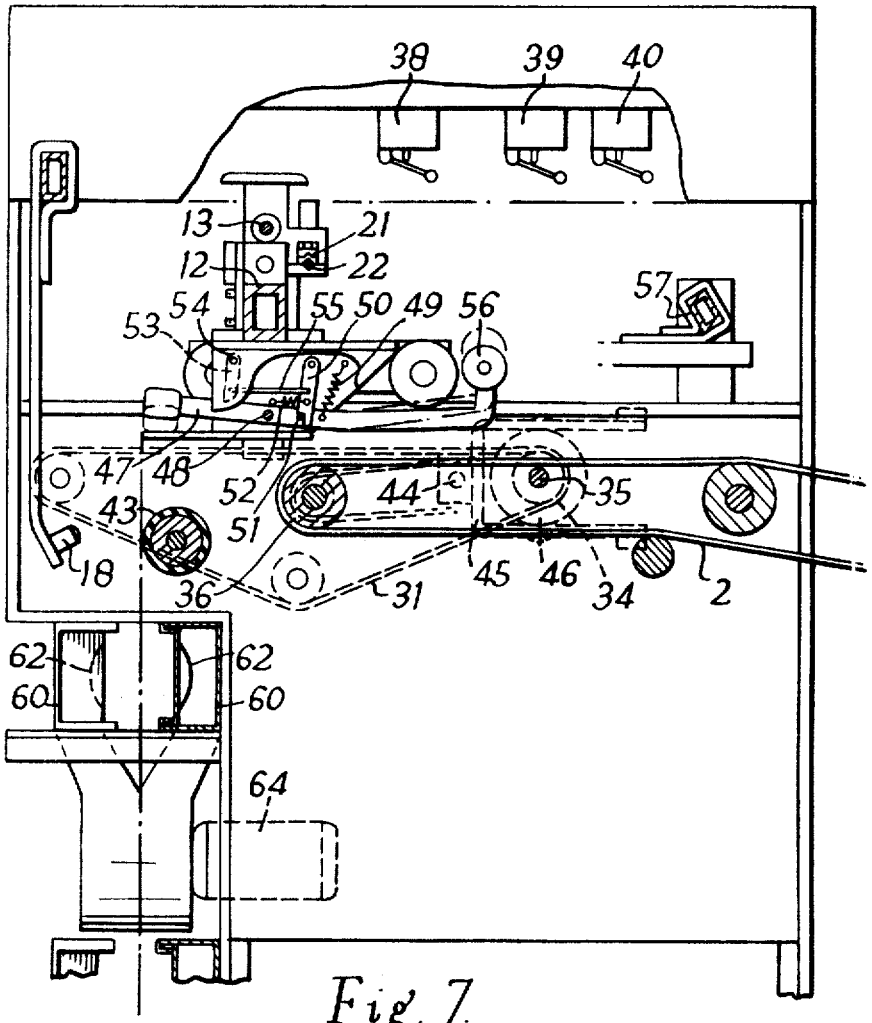
FIGURE 7 is a sectional side elevation, taken at A—A of FIGURE 2.

The arresting signal is effective also to close the pneumatic valve whereby air is admitted to ram 16 and to open a solenoid operated valve (not shown) which applies air under pressure to one side of a further double acting air ram 27 (FIGURE 1). Ram 27 is fixed by its cylinder to the frame of the machine and has its piston coupled through connecting rod 28 to beam 12. Its purpose is to provide drive for moving the beam forward and back over the conveyor, the beam being mounted on a carriage 29 at each end having wheels which run on runners 30. Actuation of ram 27 at the time of the arrest of the clamps drives the beam, and therefore the clamps with the tensioned leading edge of the sheet, forwards over the conveyor. Ram 27 is capable of accelerating beam 12 quickly to a speed appreciably greater than the conveyor speed. However, the forward speed of the beam is limited to exactly the speed of the conveyor by a pair of control chains 31, one at each side of the machine and each having a horizontal upper run 32 extending in the fore-and-aft direction of the machine to which run is fixed through a coupling member 33, the respective carriage 29. The control arrangement for the right-hand carriage is shown in FIGURE 1 and for the left-hand carriage in broken line in FIGURE 7. Chains 31 are controlled by sprockets 34 which are coupled together by a shaft 35. A sprocket 36 on the left-hand end of roller 3 is coupled through a free-wheel device by chain to the left-hand sprocket 34 (FIGURE 7). The arrangement is such that chains 31 can be driven by the carriages 29 so that the runs 32 may be moved forwards at a slower speed than conveyor 2 or even backwards but the maximum forward speed of runs 32 is limited to the forward speed of the conveyor. Thus, when ram 27 is actuated it soon accelerates beam 12 to the speed of the conveyor 2 and thereafter the forward speeds of beam and conveyor are exactly the same.

The left-hand end of beam 12 has a linear cam face 37 (FIGURE 7) which operates micro-switches 38, 39 and 40 in dependence upon the forward position of beam 12. When the beam has been driven forwards far enough for surface 37 to actuate switch 39 the position of the beam is such that a small further forward movement will open the jaws of the clamps 9 (in a manner to be described) and release the sheet. Thus, slightly before the release of the sheet, micro-switch 39 is operated and this has the effect of opening the circuit which is energising brake 21. Air ram 16 is not activated at this time and therefore release of the brake allows the clamps 9 to be drawn slightly together by the releasing tension in the leading edge of the sheet. Releasing the tension in this way ensures that the leading edge of the sheet, when it is dropped, is straight.

Actuation of switch 39 has the further effect of opening a solenoid operated pneumatic valve (not shown) which controls the supply of air to a ram 41 (FIGURE 1) which operates a brake 42. Brake 42 is effective to stop the motion of a feed roller 43 situated immediately behind the conveyor and over which the trailing part of the sheet is drawn as the clamps move forwards. Roller 43 is normally rotated through a chain drive incorporating a free-wheel device at the same peripheral speed as the conveyor. Actuation of brake 42 stops roller 43 and this has the effect of causing a drag on the sheet which, by taking into account the inherent delays in the actaution of brake 42, is arranged to occur just as the jaws of the clamps open. The drag on the sheet at this time ensures that the leading edge is drawn clear of the clamps which continue to move forward at the same speed. Thus any tendency for the leading edge to fall back over the trailing part of the sheet because of deflection by the lower jaws of the clamps is avoided. Brake 42 is released immediately it has engaged so that the arrest of roller 43 is only instantaneous.

The leading edge of the sheet having been dropped on to the conveyor, the beam 12 continues to move forward until cam surface 37 operates micro-switch 40. Operation of switch 40 opens a solenoid operated valve (not shown) which admits air to a ram 44 (FIGURE 7) which operates a brake 45 on a wheel 46 carried on shaft 35. This arrests the forward movement of the beam. Simultaneously a valve is opened which supplies air under pressure to the other side of ram 27 (FIGURE 1) so that the beam is returned to its rest position at the back of the machine. The free-wheel device on sprocket 34 allows chain 31 to move back in spite of brake 45. As the beam approaches the rest position cam surface 37 operates micro-switch 38 and thus operates a solenoid controlled valve (not shown) which admits air to the other side of ram 16, thereby returning the clamps to their innermost, rest, positions.

The clamps 9 are illustrated in detail in FIGURE 7 and the jaws 10 comprise a fixed lower jaw and a movable upper jaw which is carried on one end of an arm 47 pivoted in the clamp body at 48. Arm 47 is urged in an anti-clockwise direction about pivot 48 by a spring 49. When the clamps are presented to the operator they are held in the open position against the tension of spring 49 by a latchinug member 50 which engages a pin 51 on arm 47 and which is kept in place by a spring 52. A thumb catch 53 is mounted by a pivot pin 54 on the outside of the clamp body and is linked by a rod 55 to the latching member 50. When the corner of the sheet is in place between the jaws of the clamp the operator pushes catch 53, thereby releasing the latch and allowing spring 49 to close the jaws on the sheet. The jaws are opened to release the sheet and re-engage the latch by co-operation of a wheel 56 with a stop-bar 57 which is mounted across the machine near its front (FIGURE 2). When the clamps have been moved forwards far enough wheel 56 is depressed by engagement with the stop bar so that the jaws are opened and the latching member engages to keep them open.

In order to ensure that the trailing part of the sheet is spread adequately and is not unduly creased of folded there are provide two air-box arrangements, 58 and 59, at the rear of the machine. The two arrangements are exactly the same, one being provided immediately above the other so that at least the latter-most parts of the sheet are drawn through first the lower arrangement 58 and then the upper arrangement 59. Each air-box arrangement has hollow air-boxes 60 which define between them a shallow channel 61 up through which the sheet is drawn. The rear of the channel is open to allow access for the sheet. The outer walls of the air boxes are plain but the inner walls have louvers 62 arranged to direct air horizontally outwardly into the channel 61 from the centre of the machine (FIGURE 2). The air is supplied under pressure to the inside of the air-boxes by centrifugal fans 63 driven by electric motors 64. The sideward dragging effect on the sheet of the air with the channels spreads the sheet from its centre line.

For optimum efficiency it is desirable to make provision to ensure that the sheets are not fed so quickly that the leading edge of one overlaps the trailing edge of the preceding sheet. To this end the circuit which activates ram 16 to draw the clamps apart is interlocked with a switch which senses the passage of the trailing edge of the preceding sheet so that the machine cycle is inhibited until the trailing edge of the preceding sheet has passed. A suitable sensing switch is constituted by the lamp 64 and photocell 65 arrangement illustrated (FIGURE 5). Only when the beam of light 66 is not interrupter will the machine cycle be allowed to proceed.

Figures 8, 9, 10, 11:
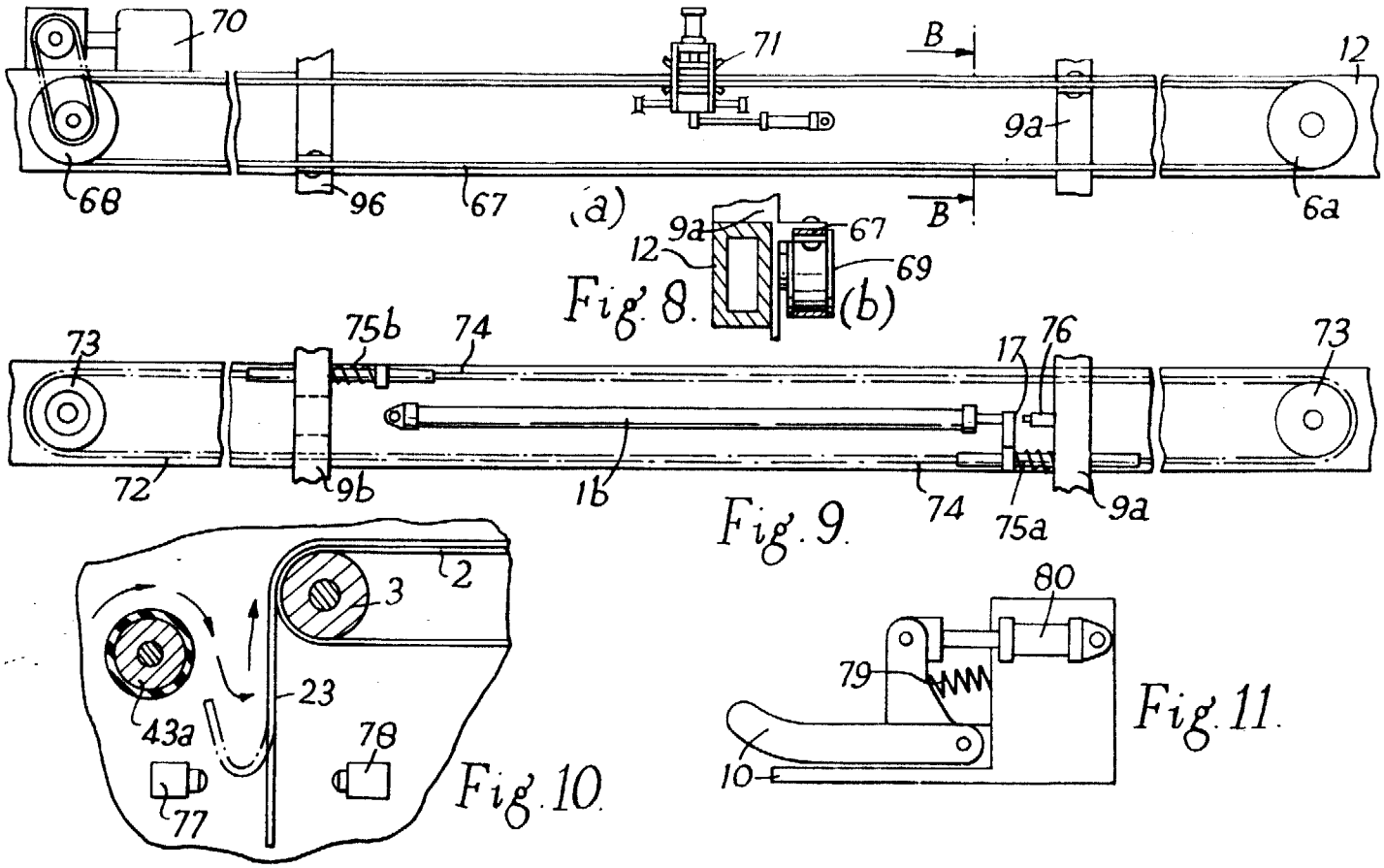
FIGURES 8 and 9 show alternative clamp transport arrangement.
FIGURE 10 is a schematic diagram illustrating an alternative form of overlap prevention sensing device.
FIGURE 11 is an illustration of an alternative form of clamp.

It is to be understood that many of the features of the above described preferred embodiment of the invention may be altered. A few alternative arrangements are shown in FIGURES 8 to 11. FIGURE 8 shows at (a) a schematic rear elevation of beam 12 with an alternative clamp drive mechanism and at (b) a sectioned side elevation taken at B—B. The clamps (not shown) are carried on supports 9a, 9b which are fixed respectively to the upper and lower runs of an endless belt 67. The belt runs on pulleys 68, 69 at each end, one of which is driven through a friction clutch by a reversible electric motor 70. The transverse movement of the clamps is arrested by a solenoid operated brake 71 which acts on the belt.

FIGURE 9 is a view similar to FIGURE 8 in which belt 67 is replaced by a loop composed in part by chain portions 72 which pass around sprockets 73 and in part by rods 74. The drive is provided by air ram 16 which is coupled to clamp 9a through a compression spring 75a. Another compression spring 75b couples clamp 9b with its rod 74. In this arrangement the arrest of the transverse movement of the clamps is initiated not by the straightening of the leading edge but by the attainment of a predetermined tension therein. The clamps tend to be held inwards by the tension in the leading edge and the tension compresses springs 75a and 75b. A micro-switch 76 is mounted on clamp 9a and when spring 75a has been compressed by the tension in the sheet this switch is operated by abutment with the end of connecting rod 17. Operation of micro-switch 76 has the same effect as breaking the light beam 20 (FIGURE 5).

FIGURE 10 shows schematically another way of sensing the passage of the trailing part of the preceding sheet. In this arrangement feed roller 43 is replaced by a roller 43a which has a peripheral speed twice the speed of the conveyor. In the manner illustrated, therefore, the trailing part of the sheet 23 is wound into a well between roller 43a and the conveyor. A lamp 77 and photocell 78 sense the passage of the trailing edge of the sheet.

FIGURE 11 illustrates another form of clamp. The jaws are loaded to the closed position by a spring 79 and opening is effected at the appropriate time by a pneumatic ram 80 operated by an electrically controlled air valve.

I claim:

1. A laundry [feding] *feeding* machine comprising a conveyor having an upper run which moves in a forward direction, a pair of clamps adapted to grip the two corners of the leading edge of a laundry article to be fed, means for moving the clamps apart transversely and holding them apart [under tension in] *whereby* the leading edge [whereby] *of* the laundry article is laterally held in tension, means [coupled with the conveyor] for advancing the clamps thus held apart oyer the upper run of the conveyor [at the same speed thereas], and means for opening the clamps to drop said leading edge on to the conveyor whereby rucking of said edge is prevented.

2. A machine as claimed in claim 1, wherein means are provided for releasing, before the leading edge is dropped, the force which holds the clamps apart against the tension in the leading edge.

3. A machine as claimed in claim 1, wherein each clamp comprises a pair of backwardly facing jaws.

4. A laundry feeding machine comprising a conveyor having an upper run which moves in a forward direction, a pair of clamps adapted to clamp the two corners of a leading edge of a laundry article to be fed, means for moving the clamps apart transversely and holding them apart under tension in the leading edge, means [coupled with the conveyor] for advancing the clamps thus held apart over the upper run of the conveyor, [at the same speed thereas] means for opening the clamps to drop the leading edge on to the conveyor, and means for moving the clamps relative to the article in a forward direction as the clamps are opened.

5. A machine as claimed in claim 4 wherein the means for moving the clamps relative to the article comprises a roller over which the trailing part of the article [is dropped] *passes* as the article is moved [forwards] *forward* and means for retarding the roller instantaneously as the clamps are opened thereby causing an instantaneous drag of the article.

6. A machine as claimed in claim 4 wherein sensing means are provided for initiating the arrest of the transverse movement of the clamps as the leading edge of the article held thereby approaches a straight line.

7. A laundry feeding machine comprising a conveyor having an upper run which moves in a forward direction, a pair of clamps adapted to grip the two corners of the laundry article to be fed, means for moving the clamps apart transversely and holding them apart under tension in the leading edge, sensing means for initiating the arrest of the transverse movement of the clamps when the leading edge of the article held thereby approaches a straight line, means [coupled to the conveyor] for advancing the clamps thus held apart [of] *over* the upper run of the conveyor, [at the same speed thereas] means for opening the clamps to drop the leading edge on the conveyor, and [a] *the* sensing means comprising a lamp and a photocell arrangement which casts a beam of light across substantially the straight line of the clamps and which issues an arrest signal when the beam of light is broken by the leading edge of the article.

8. A [machine as claimed in claim 7 wherein] *laundry feeding machine comprising a conveyor having an upper run which moves in a forward direction, a pair of clamps adapted to grip the two corners of the laundry article to be fed, means for moving the clamps apart transversely and holding them apart under tension in the leading edge, sensing means for initiating the arrest of the transverse movement of the clamps when the leading edge of the article held thereby approaches a straight line, means for advancing the clamps thus held apart over the upper run of the conveyor, means for opening the clamps to drop the leading edge on the conveyor, and* the sensing means [comprises] *comprising* a micro-switch having an operating arm engaged [by the leading edge of the article] as the leading edge is straightened, circuit means being provided whereby an arrest signal is issued upon an engagement of the operating arm.

9. A laundry feeding machine comprising a conveyor having an upper run which moves in a forward direction, a pair of clamps adapted to grip the two corners of the leading edge of a laundry article to be fed, means for moving the clamps apart transversely and holding them apart under tension in the leading edge, means for initiating the arrest of the transverse movement of the clamps when the tension of the leading edge of the article held thereby exceeds a predetermined limit, means [coupled with the conveyor] for advancing the clamps thus held apart over the upper run of the conveyor [at the same speed thereas] and means for opening the clamps to drop the leading edge on the conveyor.

10. A machine as claimed in claim 9 wherein the tension responsive means comprises a resilient mount whereby at least one of the clamps is mounted on the means for driving the clamps transversely, a micro-switch coupled with the mount to be operated when the associated clamp is moved a predetermined amount against the resilience of the mount, and circuit means whereby an arrest signal is issued on operation of the micro-switch.

11. A laundry feeding machine comprising a conveyor having an upper run which moves in a forward direction, a pair of clamps adapted to grip the two corners of the leading edge of a laundry article to be fed, at least one of said clamps comprises a pair of backwardly facing jaws, a spring for holding the jaws closed, an opening member adapted to engage a stop on the machine and thereby open the jaws against the spring force when the clamp has been moved forwards a predetermined distance, a latching mechanism for holding the jaws open against the spring force, a release catch for releasing the latching mechanism to clamp the jaws on the article to be held, means for moving the clamps apart transversely and holding them apart under tension in the leading edge, means [coupled with the conveyor for sensing] *for moving* the clamps thus held apart over the upper run of the conveyor [at the same speed thereas], and means for opening the clamps to drop the leading edge on the conveyor.

12. A machine as claimed in claim 11 wherein the release catch is manually operable by the operator as the article is placed between the jaws.

13. A machine as claimed in claim 11 wherein the clamps are mounted on a beam which extends above and across the conveyor, and being provided means for moving the beam forward and back over the conveyor, coupling means comprising an endless loop arrangement, one clamp being fixed to one side of the loop and the other clamp being fixed to the other side of the loop, the clamps being so arranged that movement of the loop arrangement moves the clamps across the beam symmetrically away from or towards the center of the beam, and driving means for moving the loop arrangement.

14. A laundry feeding machine comprising a conveyor having an upper run which moves in a forward direction, a pair of clamps adapted to grip the two corners of a leading edge of a laundry article to be fed, said clamps being mounted on a beam which extends above and across the conveyor, and being provided means for moving the beam forward and back over the conveyor, coupling means comprising an endless loop arrangement, one clamp being fixed to one side of the loop and the other clamp being fixed to the other side of the loop, the clamps being so arranged that movement of the loop arrangement moves the clamps across the beam symmetrically away from or towards the center of the beam, driving means for moving the loop arrangement, [means coupled with the conveyor for advancing the clamp thus held apart over the upper run of the conveyor at the same speed thereas, means for opening the clamps to drop the leading edge onto the conveyor, constituted of an endless wire running over pulleys mounted one on each end of the beam, the driving means comprising a linear driving mechanism coupled directly to one of the clamps, a brake mechanism comprising a brake rod fixed to one of the clamps and extending across the beam, a friction brake fixed to the beam and arranged, on actuation, to clamp the brake rod and thereby arrest the transverse movement of the clamps and hold the clamps in the arrested position] *a friction brake on the beam arranged, on actuation, to arrest the transverse movement of the clamps and hold the clamps in the arrested position, means for advancing the clamp thus held apart over the upper run of the conveyor, means for opening the clamps to drop the leading edge onto the conveyor.*

15. A machine as claimed in claim 14 wherein the loop arrangement is constituted by [an endless chain arrangement running over sprockets] *elements* mounted one on each end of the beam, one of the elements including a brake which on actuation [brakes the sprocket and] thereby arrests the transverse movement of the clamps and holds the clamps in the arrested position.

16. A laundry feeding machine comprising a conveyor having an upper run which moves in a forward direction, a pair of clamps adapted to grip the two corners of a leading edge of a laundry article to be fed, means for moving the clamps apart transversely and holding them apart under tension in the leading edge, means [coupled with the conveyor] advancing the clamps thus held apart *over* [of] the upper run of the conveyor [at the same speed] means for opening the clamps to drop the leading edge onto the conveyor, and air-box *arrangement* [means] placed below said clamps and whereby the trailing part of the laundry article is drawn up and let through said air-box arrangement, said air-box arrangement defining a substantially vertical channel through which the trailing part of the article is drawn, [the channel having an opening at the rear to allow access to the article thereto, the air-box arrangement comprising hollow air-boxes,] means for supplying air under pressure [thereto, the air-boxes having louvres which open into the channel and which direct pressurized air from within the air-boxes] *for discharge* horizontally into the channel outwardly from its center whereby said article is fluffingly laterally positioned to avoid rucking of the same.

*17. A machine as claimed in claim 4 wherein the means for moving the clamps relative to the article comprises a roller on which the trailing part of the article rides as the article is moved forward, and said roller causing a drag on the trailing part of the article and advancing the same at a slower rate than the advance of the clamp moving means as the clamps are opened.*

*18. A machine as claimed in claim 9 wherein the tension responsive means comprises that at least one of the clamps is mounted to move relative to the means for driving the clamps transversely, a microswitch operated when the associated clamp is moved a predetermined amount, and circuit means whereby an arrest signal is issued on operation of the microswitch.*

*19. A laundry feeding machine comprising a conveyor having an upper run which moves in a forward direction,*

*a pair of clamps adapted to grip the two corners of the leading edge of a laundry article to be fed, at least one of said clamps comprises a pair of backwardly facing jaws, a spring for holding the jaws closed, means adapted to open the jaws against the spring force and then release the same suitable to clamp the jaws on the article to be held, means for moving the clamps apart transversely and holding them apart under tension in the leading edge, means for moving the clamps thus held apart over the upper run of the conveyor, and means for opening the clamps to drop the leading edge on the conveyor.*

*20. A machine as claimed in claim 1, wherein the clamps are mounted on a beam which extends above and across the conveyor, and wherein means are provided for moving the beam forwardly and back over the conveyor.*

*21. A machine as claimed in claim 1, wherein the clamp moving means includes an endless loop arrangement, one clamp being fixed to one side of the loop and the other clamp being fixed to the other side of the loop, the clamps being so arranged that movement of the loop arrangement moves the clamps symmetrically away from or towards the center of the machine, and driving means for moving the loop arrangement.*

*22. A machine as claimed in claim 21, wherein a brake is associated with the loop arrangement suitable when engaged to hold the clamps fixed distances apart.*

*23. A machine according to claim 1, wherein means located below said clamps acts on the trailing part of the laundry article and permits simultaneous movement of the trailing part in the direction toward the leading edge and laterally extends the article to avoid rucking of the same.*

*24. In a laundry feeding machine comprising an elongated beam, a pair of clamps supported to move along the beam and adapted to grip the two corners of a leading edge of a laundry article to be fed, means to move the clamps including an endless loop arrangement extended along the beam, one clamp being fixed to one side of the loop and the other clamp being fixed to the other side of the loop, the clamps being so arranged that movement of the loop arrangement moves the clamps along the beam symmetrically away from or towards a point thereon, driving means for moving the loop arrangement, and sensing means for stopping the separation of the clamps upon the leading edge of the article held thereby approaching a straight line, wherein means are located below said beam and said clamps that acts on the trailing part of the laundry article and laterally extends the trailing part of the article to avoid rucking of the same.*

*25. In a laundry feeding machine comprising an elongated beam, a pair of clamps supported to move along the beam and adapted to grip the two corners of a leading edge of a laundry article to be fed, means to move the clamps including an endless loop arrangement extended along the beam, one clamp being fixed to the other side of the loop and the other clamp being fixed to the other side of the loop, the clamps being so arranged that movement of the loop arrangement moves the clamps along the beam symmetrically away from or towards a point thereon, driving means for moving the loop arrangement, and sensing means for stopping the separation of the clamps upon the leading edge of the article held thereby approaching a straight line, wherein a friction brake is arranged, on actuation, to arrest the transverse movement of the clamps and hold the clamps in the arrested position.*

References Cited

The following references, cited by the Examiner, are of record in the patented file of this patent or the original patent.

UNITED STATES PATENTS

| | | | |
|---|---|---|---|
| 986,822 | 3/1911 | Hardy | 271—79 |
| 1,808,514 | 6/1931 | Zuckerman | 271—79 |
| 1,920,715 | 8/1933 | Sager | 271—79 |
| 3,071,371 | 1/1963 | Wickland | 271—26 |
| 3,201,116 | 8/1965 | Barber | 271—79 |
| 3,288,465 | 11/1966 | Cook | 271—74 |
| 3,376,036 | 4/1968 | Weir | 38—143 UX |
| 2,654,969 | 10/1953 | Woodward | 38—143 |
| 3,174,238 | 3/1965 | Grantham | 38—143 |

JOSEPH WEGBREIT, Primary Examiner

U.S. Cl. X.R.

198—134

UNITED STATES PATENT OFFICE

CERTIFICATE OF CORRECTION

Patent No. Reissue No. 27,442 Dated July 18, 1972

Inventor(s) Henry John Weir

It is certified that error appears in the above-identified patent and that said Letters Patent are hereby corrected as shown below:

Column 8, line 56, "of" should read -- on --.

Signed and sealed this 23rd day of January 1973.

(SEAL)
Attest:

EDWARD M.FLETCHER,JR.
Attesting Officer

ROBERT GOTTSCHALK
Commissioner of Patents

USCOMM-DC 60376-P69
* U.S. GOVERNMENT PRINTING OFFICE : 1969 O—366-334.